UNITED STATES PATENT OFFICE.

JOHN W. WATTS, OF BALTIMORE, MARYLAND.

MANUFACTURE OF ARTIFICIAL STONE AND MARBLE.

SPECIFICATION forming part of Letters Patent No. 260,511, dated July 4, 1882.

Application filed May 2, 1882. (No specimens.)

*To all whom it may concern:*

Be it known that I, JOHN W. WATTS, of Baltimore city, State of Maryland, have invented certain new and useful Improvements in the Manufacture of Artificial Stone and Marble; and I hereby declare the same to be fully, clearly, and exactly described, as follows:

My invention has reference in general to the manufacture of artificial stone or marble adapted for use as building or paving blocks, for tops for tables and other articles of furniture, and analogous uses; and it relates in particular to compositions in which a suitable hydraulic cement is set by means of an aqueous solution of certain reagents. In practice I take any of the standard hydraulic cements—such as Portland, Rosendale, or Keen—and mix it in any desired proportion with fine sand or gravel.

If desired, of course coloring-matter may be added, and gypsum, if it is desired to lighten the color of the stone. I then prepare a solution by adding to one hundred gallons of lime-water about five pounds of a saturated solution of alkaline silicate and about five pounds of Russia isinglass or glue in solution. The cement is dampened with the solution while warm, and tamped and pressed in molds, as usual. When fully set and dry the stone is treated with a solution compound of one pound of glue or isinglass dissolved in about ten gallons of water, to which about one-half pound of copperas and three pounds of alum have been added. This treatment has the effect to render the stone hard and impervious to water.

Prepared as described, the stone is very strong, hard, and durable, resisting changes of temperature and climate without cracking, crumbling, or suffering even superficial deterioration.

The stone possesses a marked advantage over other artificial stones in that it contains in its mass no ingredients which are liable to effloresce upon the surface and mar the appearance of the blocks. The solution, being applied hot or warm and containing gelatine in solution, dries to a considerable extent in cooling, while the alkaline silicate seems to react slowly with the lime, forming a double silicate of alkali and alkaline earth, which binds the particles strongly together. The presence of the gelatine retards this reaction, besides aiding in accelerating the drying of the stone.

I am aware that lime-water has been used in connection with various salts to form solutions for setting cement, and that gelatine has entered into compositions for the same purpose, as has also alkaline silicate; but I am not aware that they have been used together, either with or without other substances; and I therefore claim—

1. A concrete consisting of a suitable hydraulic-cement base set with a solution of lime-water, alkaline silicate, and glue, substantially as described.

2. The method herein described of forming artificial stone, consisting in setting a suitable hydraulic-cement base with a solution of lime-water, alkaline silicate, and glue, and applying to the surface of the finished stone a solution of glue, copperas, and alum, as set forth.

JOHN W. WATTS.

Witnesses:
R. D. WILLIAMS,
W. A. BERTRAM.